(12) United States Patent
Aldredge

(10) Patent No.: US 10,014,672 B1
(45) Date of Patent: Jul. 3, 2018

(54) LINESMAN PLIERS

(71) Applicant: Robert L. Aldredge, Englewood, OH (US)

(72) Inventor: Robert L. Aldredge, Englewood, OH (US)

( * ) Notice: Subject to any disclaimer, the term of this patent is extended or adjusted under 35 U.S.C. 154(b) by 0 days.

(21) Appl. No.: 15/803,881

(22) Filed: Nov. 6, 2017

(51) Int. Cl.
| | |
|---|---|
| *B25B 7/12* | (2006.01) |
| *H02G 1/12* | (2006.01) |
| *H01R 43/05* | (2006.01) |
| *B25B 7/22* | (2006.01) |
| *H01R 43/042* | (2006.01) |

(52) U.S. Cl.
CPC .............. *H02G 1/1212* (2013.01); *B25B 7/12* (2013.01); *B25B 7/22* (2013.01); *H01R 43/0421* (2013.01); *H01R 43/05* (2013.01)

(58) Field of Classification Search
CPC .. H01G 1/1212; H01R 43/0421; H01R 43/05; B25B 7/12; B25B 7/22
USPC .................. 81/350, 351, 383; 7/107; 29/751
See application file for complete search history.

(56) References Cited

U.S. PATENT DOCUMENTS

| | | | | |
|---|---|---|---|---|
| 876,963 | A * | 1/1908 | Hoak ...................... | B25B 7/22 140/123 |
| 1,399,665 | A * | 12/1921 | Shapiro ................... | B25B 7/02 7/130 |
| 2,668,464 | A * | 2/1954 | Paules .................. | H01R 43/042 30/91.2 |
| 2,743,634 | A * | 5/1956 | Badeau ................ | H01R 43/042 72/431 |
| 3,553,999 | A * | 1/1971 | Rommel ............... | H01R 43/042 29/752 |
| 4,225,990 | A * | 10/1980 | Theiler, Sr. ............... | B25B 7/22 140/106 |
| 4,381,661 | A * | 5/1983 | Wiener ..................... | B25B 7/12 72/409.12 |
| 5,063,770 | A * | 11/1991 | Chen .................. | H01R 43/0421 140/106 |
| 5,649,572 | A * | 7/1997 | Lile ......................... | B21F 15/04 140/121 |
| 5,894,617 | A * | 4/1999 | Liou ........................ | B25B 7/02 7/107 |
| 7,350,393 | B2 * | 4/2008 | Li .............................. | B25B 7/04 29/751 |

* cited by examiner

*Primary Examiner* — Bryan R Muller
(74) *Attorney, Agent, or Firm* — Donald J. Ersler

(57) ABSTRACT

An improved linesman pliers preferably includes a lower handle, a lower jaw, a pair of link plates and a combination upper handle and jaw. The lower handle includes a lower handle portion and a lower pivot portion. The lower jaw preferably includes a lower jaw portion, a pivot boss, a stripper projection and a crimp projection. At least one upper stripper cavity is formed in the stripper projection, which is aligned with the at least one lower stripper cavity formed in the lower pivot portion. The pivot boss is pivotally engaged with the lower pivot portion. A pair of link plates pivotal engage the combination upper handle and jaw with the lower handle. The combination upper handle and jaw includes the upper handle portion and an upper jaw. The upper handle portion is pivotally engaged with the lower jaw portion.

9 Claims, 5 Drawing Sheets

LINESMAN PLIERS

BACKGROUND OF THE INVENTION

1. Field of the Invention

The present invention relates generally to hand tools and more specifically to an improved linesman pliers, which provides increased clamping, cutting force with the use of a single hand.

2. Discussion of the Prior Art

It appears that the prior art does not disclose an improved linesman pliers. A typical linesman pliers has an open handle distance of 6 inches and an open jaw distance of 1 inch. The distance of 6 inches requires the use of two hands to exert force upon what is placed in the jaws.

Accordingly, there is a clearly felt need in the art for an improved linesman pliers, which provides increased clamping and cutting force with the use of a single hand.

SUMMARY OF THE INVENTION

The present invention provides an improved linesman pliers, which provides increased clamping and cutting force relative to a prior art linesman pliers. The improved linesman pliers preferably includes a lower handle, a lower jaw, a pair of link plates and a combination upper handle and jaw. The lower handle includes a lower handle portion and a lower pivot portion. The lower handle portion extends from the lower pivot portion. The lower pivot portion includes a lower pivot hole formed through an end thereof and a lower link hole formed through an opposite end thereof. At least one lower stripper cavity is formed between the lower pivot hole and the lower link hole on an edge of the lower pivot portion. The lower jaw preferably includes a lower jaw portion, a pivot boss, a stripper projection and a crimp projection. The pivot boss extends from one end and one side of the lower jaw portion. A lower handle pivot hole is formed through the pivot boss. The stripper projection extends from the one end of the lower jaw portion. At least one upper stripper cavity is formed in the stripper projection, which is aligned with the at least one lower stripper cavity. The crimp projection extends from the one end and an opposing side of the lower jaw portion. A lower jaw pivot hole is formed through the one end of the lower jaw portion, adjacent the stripper projection. A cutting edge is formed on a top of the lower jaw portion. A lower cutting edge cavity is formed behind the lower cutter edge.

One end of the pair of link plates are pivotally engaged to opposing sides of the lower pivot portion with a lower pivot pin inserted through the lower link hole. An opposite end of the pair of link plates are pivotally engaged with an upper handle of the combination upper handle and jaw with an upper pivot pin. The combination upper handle and jaw includes an upper jaw and the upper handle. The upper handle extends from the upper jaw. A crimp cavity is formed in a top of the upper handle, adjacent the upper jaw. A cutting edge is formed on a bottom of the upper jaw. An upper cutting edge cavity is formed behind the upper cutter edge. The upper jaw is pivotally engaged with the lower jaw.

Accordingly, it is an object of the present invention to provide an improved linesman pliers, which provides increased clamping and cutting force relative to a prior art linesman pliers.

These and additional objects, advantages, features and benefits of the present invention will become apparent from the following specification.

DETAILED DESCRIPTION OF THE PREFERRED EMBODIMENTS

Figure 1:
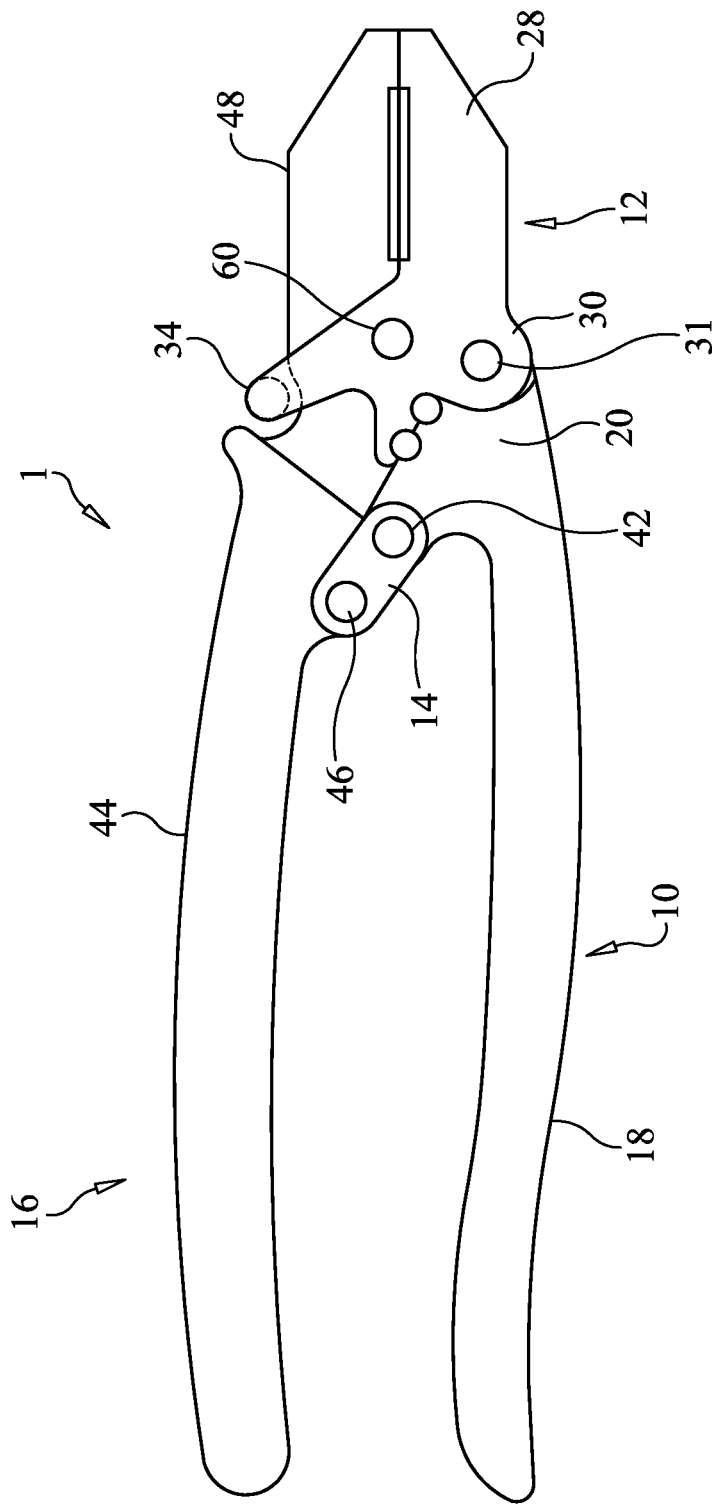
FIG. 1 is a side view of an improved linesman pliers in a closed orientation in accordance with the present invention.
Figure 2:
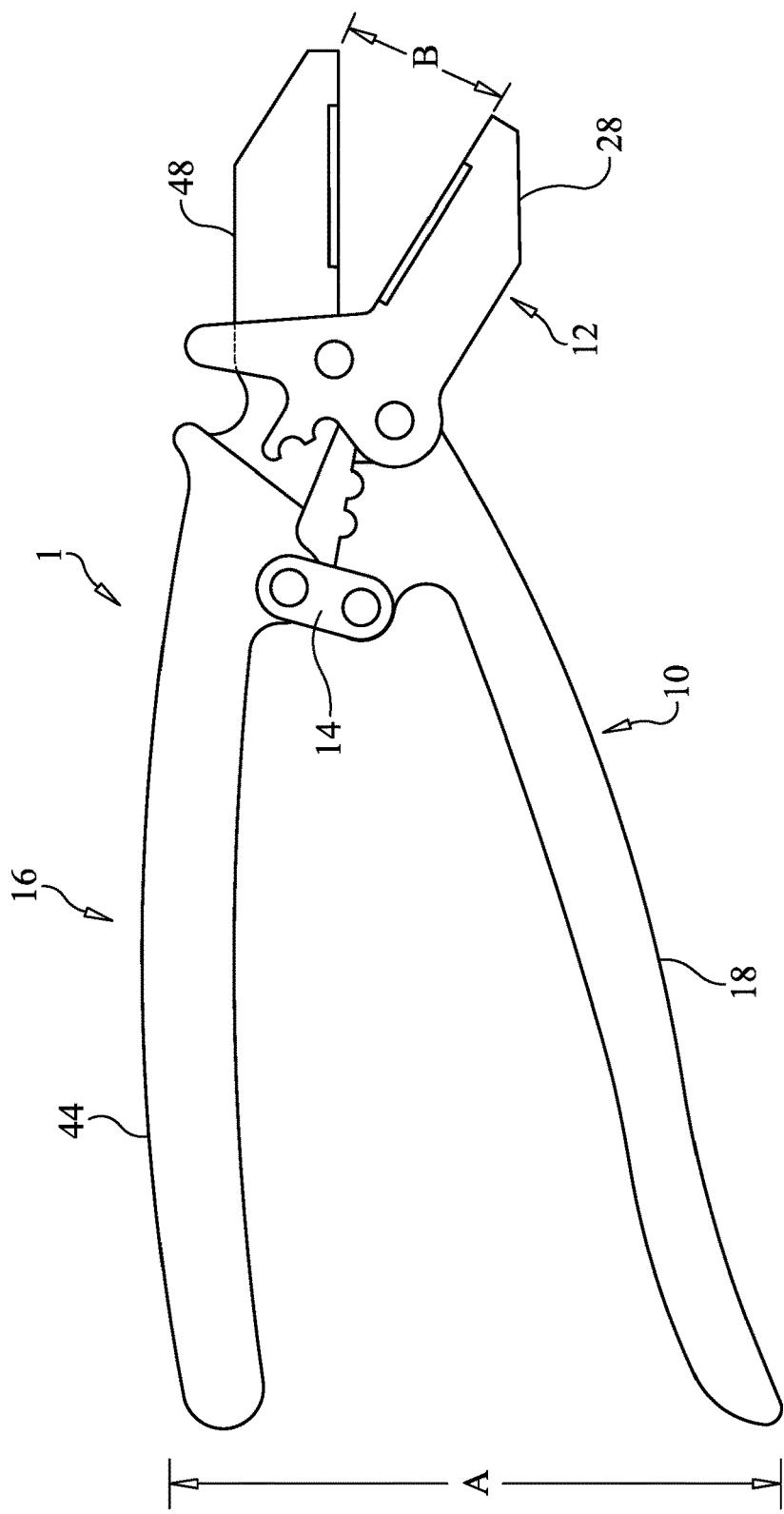
FIG. 2 is a side view of an improved linesman pliers in an opened orientation in accordance with the present invention.

With reference now to the drawings, and particularly to FIG. 1, there is shown a side view of an improved linesman pliers 1 in a closed orientation. With reference to FIGS. 2-5, the improved linesman pliers 1 preferably includes a lower handle 10, a lower jaw 12, a pair of link plates 14 and a combination upper handle and jaw 16 (upper handle). The lower handle 10 includes a lower handle portion 18 and a lower pivot portion 20. The lower handle portion 18 extends from the lower pivot portion 20. The lower pivot portion 20 includes a lower pivot hole 22 formed through an end thereof and a lower link hole 24 formed through an opposite end thereof. At least one lower stripper cavity 26 is formed on an edge of the lower pivot portion between the lower pivot hole 22 and the lower link hole 24. The lower jaw 12 preferably includes a lower jaw portion 28, a pivot boss 30, a stripper projection 32 and a crimp projection 34. The pivot boss 30 extends from one end and one side of the lower jaw portion 28. A lower handle pivot hole 35 is formed through the pivot boss 30. The stripper projection 32 extends from the one end of the lower jaw portion 28.

Figure 3:
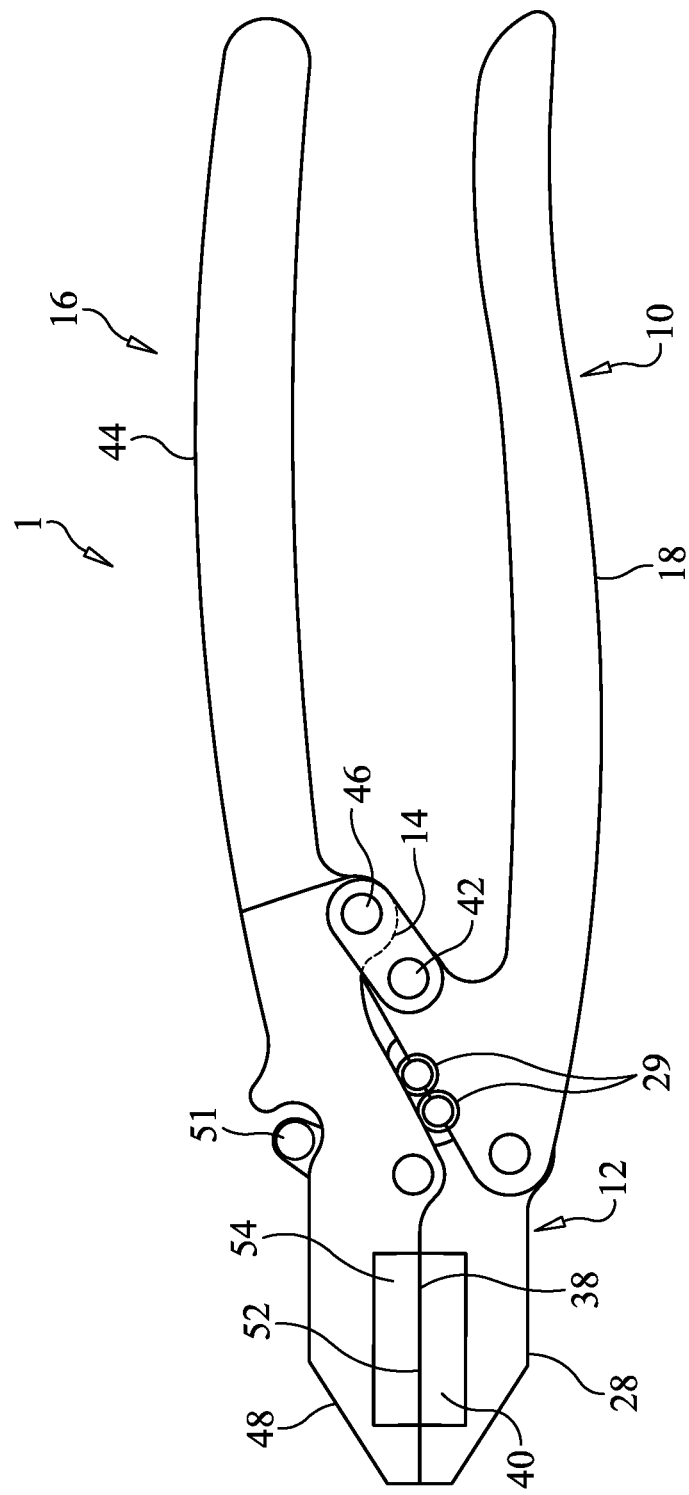
FIG. 3 is a reverse side view of an improved linesman pliers in a closed orientation in accordance with the present invention.
Figure 4:
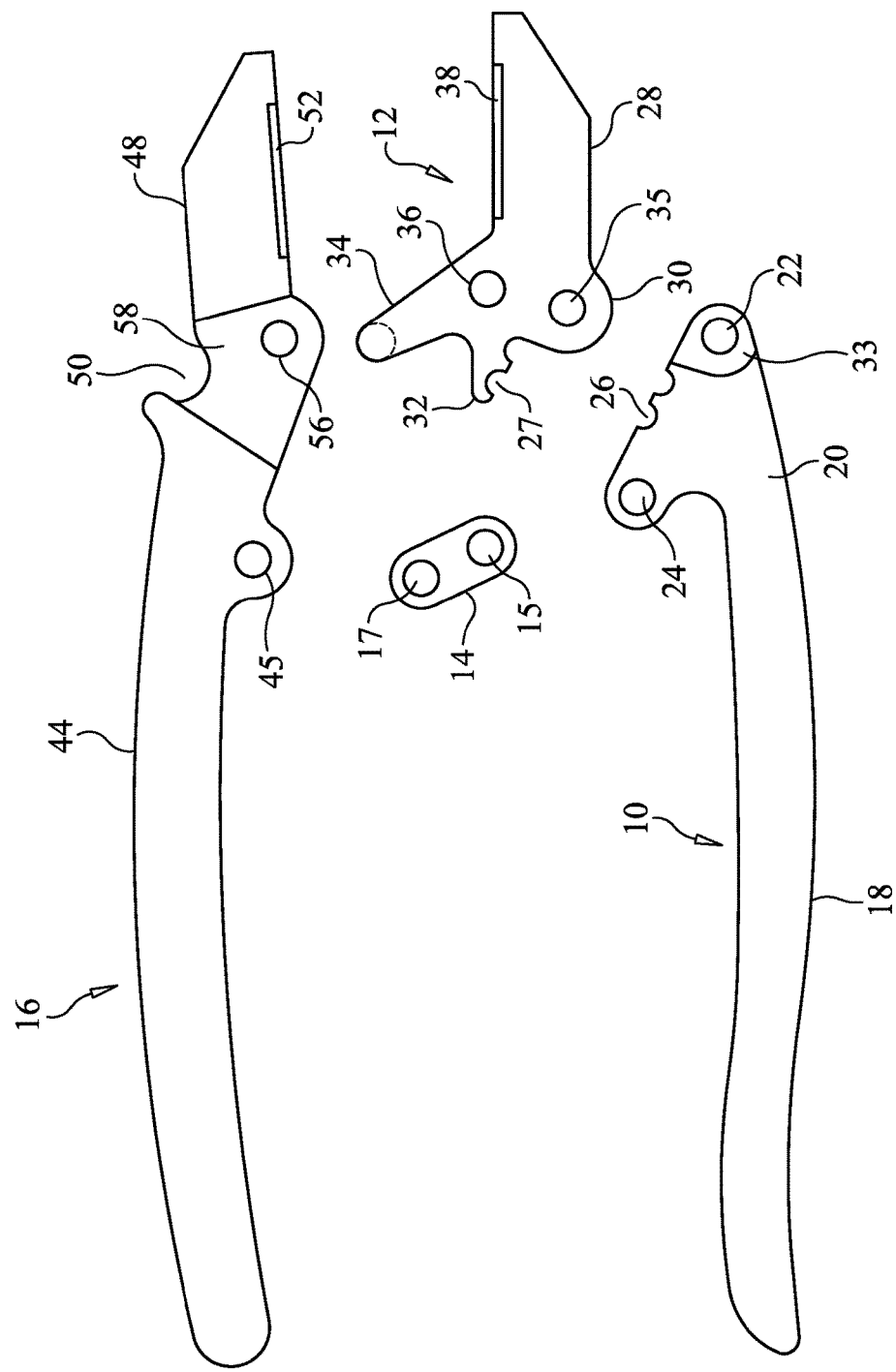
FIG. 4 is a side exploded view of an improved linesman pliers in accordance with the present invention.
Figure 5:
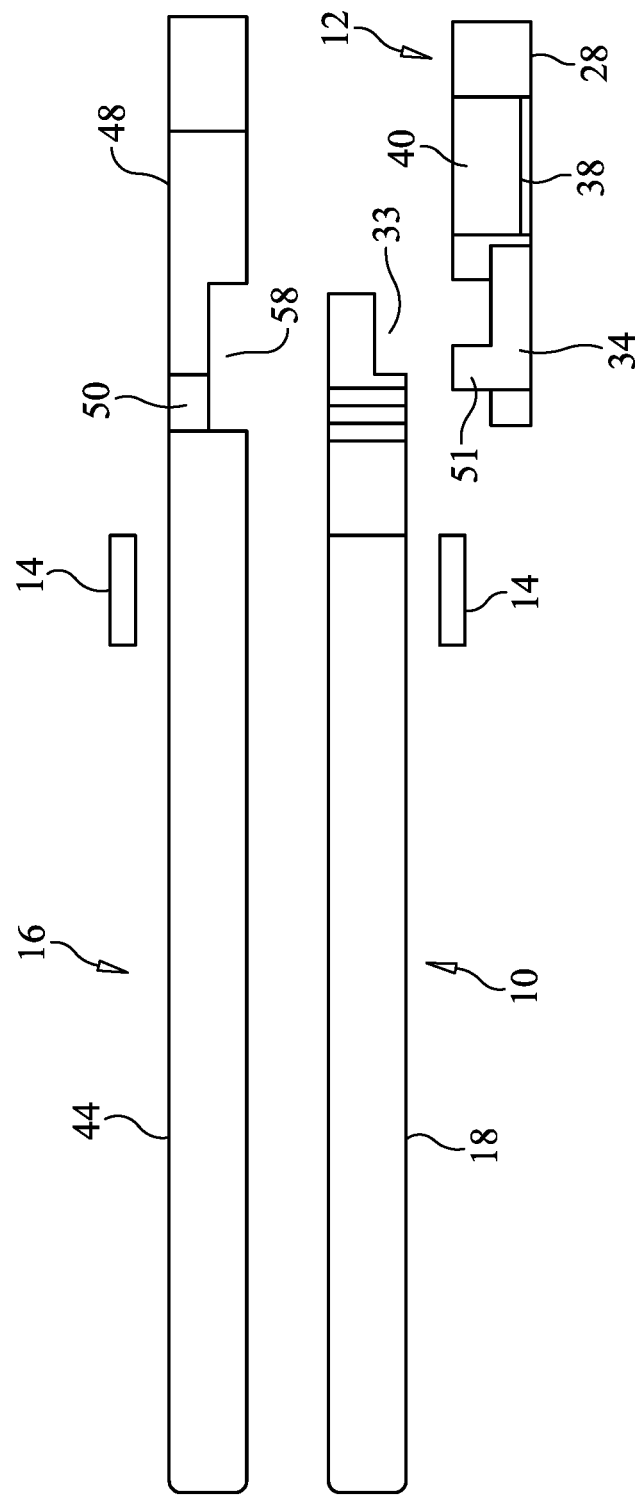
FIG. 5 is a top exploded view of an improved linesman pliers in accordance with the present invention.

At least one upper stripper cavity 27 is formed in the stripper projection 32, which is aligned with the at least one lower stripper cavity 26. Stripper relief cavities 29 are formed behind the at least one lower and upper stripper cavities 26, 27. A cutting edge is formed on the at least one lower and upper stripper cavities 26, 27 to strip insulation from a wire. The crimp projection 34 extends from the one end and an opposing side of the lower jaw portion 28. A lower jaw pivot hole 36 is formed through the one end of the lower jaw portion 28, adjacent the stripper projection 32. A cutting edge 38 is formed on a top of the lower jaw portion 28. With reference to FIG. 3, a lower cutting edge cavity 40 is formed behind the lower cutting edge 38. The pivot boss 30 is pivotally connected to the lower pivot hole 22 with a lower jaw pivot pin 31. A pivot slot 33 is formed in an end of the lower handle portion 18 to receive the pivot boss 30.

One end of the pair of link plates 14 are pivotally engaged to opposing sides of the lower pivot portion 20 with a lower pivot pin 42 inserted through lower pivot holes 15 in the pair of link plates 14 and the lower link hole 24. An opposite end of the pair of link plates 14 are pivotally engaged with an upper handle 44 of the combination upper handle and jaw 16 with an upper pivot pin 46 inserted through upper pivot holes 17 in the pair of link plates 14 and a upper handle pivot hole 45. The combination upper handle and jaw 16 includes an upper handle 44 and an upper jaw 48. The upper handle 44 extends from the upper jaw 48. A crimp cavity 50 is formed in a top of the upper handle 44, adjacent the upper jaw 48. The crimp projection 34 includes crimp extension 51, which extends from a side of the crimp projection 34. The crimp extension 51 is sized to be received by the crimp cavity 50, when the improved locking pliers 1 is in a closed orientation. A top cutting edge 52 is formed on a bottom of the upper jaw 48. An upper cutting edge cavity 54 is formed behind the upper cutting edge 52. An upper jaw pivot hole 56 is formed through the upper jaw 48. A jaw relief slot 58 is formed adjacent the upper cutting edge 52. The jaw relief slot 58 is formed between the upper jaw 48 and the upper handle 44. The jaw relief slot 58 is sized to receive a portion of the lower jaw portion 28, the stripper projection 32 and the crimp projection 34. A jaw pivot pin 60 is inserted through the lower jaw pivot hole 36 and the upper jaw pivot hole 56, such that the lower jaw portion 28 pivots to the upper jaw 48.

The following limitations are given by way of example and not by way of limitation. An open distance A of the lower handle portion 18 and the upper handle 44 is preferably 4 inches, but other distances may also be used. While open distance B of the lower jaw 28 and the upper jaw 48 is preferably 1.25 inches, but other distances may also be used.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

I claim:

1. An improved linesman pliers comprising:
   a lower handle includes a first end, at least one lower stripper cavity is formed in said first end;
   a lower jaw is pivotally engaged with said first end of said lower handle at a first pivot point, a stripper projection extends from said lower jaw adjacent said first pivot point, at least one upper stripper cavity is formed in said stripper projection, wherein said at least one lower stripper cavity is aligned with said at least one upper stripper cavity;
   an upper handle includes an upper handle portion and an upper jaw, said upper jaw extends from a first end of said upper handle portion, said lower jaw is pivotally engaged with said upper jaw at a second pivot point; and
   at least one link plate having one end pivotally engaged with said first end of said lower handle at a third pivot point and an opposing end pivotally engaged with said first end of said upper handle portion at a fourth pivot point;
   wherein the lower stripper cavity is located on the lower handle substantially between the first and third pivot points.

2. The improved linesman pliers of claim 1 wherein:
   a crimp cavity is formed in a top of said upper handle portion, adjacent said upper jaw; and
   a crimp projection extends from said lower jaw, said crimp projection includes a crimp extension, said crimp extension extends from a side of said crimp projection, said crimp extension is sized to be received by said crimp cavity, when said improved linesman pliers is closed.

3. The improved linesman pliers of claim 1 wherein:
   a jaw relief slot is formed between said upper jaw and said upper handle portion, said jaw relief slot is sized to receive a portion of said lower jaw.

4. An improved linesman pliers comprising:
   a lower handle having a lower handle portion and a lower pivot portion;
   a lower jaw pivotally engaged with said lower handle at a first pivot point passing through the lower pivot portion, said lower jaw includes a crimp projection extending upward from said lower jaw away from said first pivot point, said crimp projection includes a substantially cylindrical crimp extension extending laterally therefrom, said crimp extension having a central cylindrical axis which is substantially parallel to the axis of said first pivot point;
   an upper handle includes an upper handle portion and an upper jaw, said upper jaw extends from a first end of said upper handle portion, a second pivot point pivotally engaging said lower jaw with said upper jaw, a crimp cavity is formed between said upper handle and said upper jaw opposite said lower jaw and said lower handle, said crimp cavity is sized to receive said crimp extension; and
   at least one link plate having one end pivotally engaged with said lower pivot portion at a third pivot point and an opposing end pivotally engaged with said first end of said upper handle.

5. The improved linesman pliers of claim 4 wherein:
   at least one lower wire stripper cavity is formed in an edge of said lower pivot portion; and
   said lower jaw includes a stripper projection, at least one upper wire stripper cavity is formed in said stripper projection.

6. The improved linesman pliers of claim 4 wherein:
   a jaw relief slot is formed between said upper jaw and said upper handle portion said jaw relief slot is sized to receive a portion of said lower jaw.

7. An improved linesman pliers comprising:
   a lower handle includes a first end, at least one lower stripper cavity is formed in said first end;
   a lower jaw is pivotally engaged with said first end of said lower handle at a first pivot point, a lower cutting edge is formed on said lower jaw, a stripper projection extends from said lower jaw adjacent said first pivot point, at least one upper stripper cavity is formed in said stripper projection, wherein said at least one lower stripper cavity is aligned with said at least one upper stripper cavity;
   an upper handle includes an upper handle portion and an upper jaw, said upper jaw extends from a first end of said upper handle portion, said lower jaw is pivotally engaged with said upper jaw at a second pivot point, an upper cutting edge is formed on said upper jaw; and
   at least one link plate having one end pivotally engaged with said first end of said lower handle at a third pivot point and an opposing end pivotally engaged with said first end of said upper handle portion at a fourth pivot point;
   wherein the lower stripper cavity is located on the lower handle substantially between the first and third pivot points.

8. The improved linesman pliers of claim 7 wherein:
   a crimp cavity is formed in a top of said upper handle portion, adjacent said upper jaw; and
   a crimp projection extends from said lower jaw, said crimp projection includes a crimp extension, said crimp extension extends from a side of said crimp projection, said crimp extension is sized to be received by said crimp cavity when said improved linesman pliers is closed.

9. The improved linesman pliers of claim 7 wherein:

a jaw relief slot is formed between an upper jaw and said upper handle portion, said jaw relief slot is sized to receive a portion of said lower jaw.

* * * * *